United States Patent
Yoshida

(10) Patent No.: US 6,285,821 B1
(45) Date of Patent: Sep. 4, 2001

(54) EXTERNAL INPUT SIGNAL PROCESSING CIRCUIT FOR A TELEVISION RECEIVER WITH A VIDEO TAPE RECORDER FOR THE PURPOSE OF VIEWING COPY-PROTECTED VIDEO SIGNALS

(75) Inventor: Noboru Yoshida, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 08/439,793

(22) Filed: May 12, 1995

(30) Foreign Application Priority Data

May 12, 1994 (JP) ...................................... 6-98308

(51) Int. Cl.$^7$ .................................................. H04N 5/923
(52) U.S. Cl. .............................................. 386/93; 386/94
(58) Field of Search ......................... 358/335, 84; 380/5; 348/584, 588, 705, 706, 678–682; 360/61, 62; 455/234.1, 241.1, 247.1; 386/131, 35, 46, 83, 85, 93, 94, 113

(56) References Cited

U.S. PATENT DOCUMENTS

| D. 258,286 | * | 2/1981 | Ishida et al. ........................... D14/79 |
| 4,633,302 | * | 12/1986 | Damoci .................................. 358/84 |
| 4,695,901 | * | 9/1987 | Ryan ......................................... 380/5 |
| 4,809,089 | * | 2/1989 | Richie .................................. 360/33.1 |
| 4,811,122 | * | 3/1989 | Kido et al. .............................. 360/25 |
| 4,937,679 | * | 6/1990 | Ryan ..................................... 358/335 |
| 5,045,926 | * | 9/1991 | Amano et al. ......................... 358/21 |

FOREIGN PATENT DOCUMENTS

| 5269520 | * | 6/1977 | (JP) . |
| 5269521 | * | 6/1977 | (JP) . |
| 5631278 | * | 3/1981 | (JP) . |
| A-4-142189 | | 5/1992 | (JP) . |

\* cited by examiner

Primary Examiner—David R. Vincent
(74) Attorney, Agent, or Firm—Bacon & Thomas

(57) ABSTRACT

A television receiver with a video tape recorder, in which a common terminal of an external-input changeover switch is connnected to one input terminal of a first changeover switch via an AGC circuit, the other input terminal is connected to an output of a video signal reproducing circuit, and a common terminal of the first changeover switch is connected to a television signal processing circuit. Further, a second changeover switch is interposed between the common terminal of the first changeover switch and the television signal processing circuit, one input terminal of the second changeover switch is connected to an input terminal side of the AGC circuit, the other input terminal is connected to the common terminal of the first changeover switch, and the common terminal is connected to the television signal processing circuit. Furthermore, a switch circuit is disposed which controls the first and second changeover switches so as to be operated in an interlocked manner.

4 Claims, 2 Drawing Sheets

EXTERNAL INPUT SIGNAL PROCESSING CIRCUIT FOR A TELEVISION RECEIVER WITH A VIDEO TAPE RECORDER FOR THE PURPOSE OF VIEWING COPY-PROTECTED VIDEO SIGNALS

BACKGROUND OF THE INVENTION

1. Field of the Invention

The invention relates to a television receiver with a video tape recorder integrally incorporated therein, the video tape recorder having recording and reproducing functions.

2. Description of the Related Art

In order to respond to various consumer needs due to recent increases in variety of life-style, a television receiver with a video tape recorder, which has recording and reproducing functions and is integrally incorporated therein, is becoming widespread.

Generally, such a television receiver with a video tape recorder has a configuration shown in FIG. 2.

A common terminal c of an external-input changeover switch 22 which functions as an external input terminal of a video tape recorder 21 is connected to a video signal recording circuit 25 and to one input terminal (R/EE terminal) a of a first changeover switch 24, via an automatic gain control (AGC) circuit 23 which adjusts the level of an input signal to a constant value. The output of a video signal reproducing circuit 26 is connected to the other input terminal (P terminal) b of the first changeover switch 24.

The video signal recording circuit 25 is a block which records a video signal on a recording medium 27 such as a video tape loaded into the video tape recorder 21. The video signal reproducing circuit 26 is a block which reproduces a video signal recorded on the loaded recording medium 27.

An external input terminal 32 to which a separate video tape recorder (not shown) or the like is to be connected is connected to one input terminal a of the external-input changeover switch 22. A radio frequency (RF) input terminal 28 to which a television antenna (not shown) or the like is to be connected is connected to the other input terminal b of the external-input changeover switch 22, via a tuning circuit 29, an intermediate frequency (IF) amplifier circuit 30, and a detection circuit 31.

A common terminal c of the first changeover switch 24 is connected to a television signal processing circuit 33. A video signal output of the television signal processing circuit 33 is supplied to a cathode ray tube (CRT) 34, and an audio signal output of the circuit to a loudspeaker 35.

In the thus configured television receiver with a video tape recorder, when a video signal reproduced from a recording medium such as a video tape by the separate video tape recorder connected to the external input terminal 32 is to be input, the common terminal c of the external-input changeover switch 22 is connected to the input terminal a of the changeover switch 22. Also, the common terminal c of the first changeover switch 24 is connected to the input terminal a of the changeover switch 24.

As a result of the connection, the video signal reproduced by the separate video tape recorder is supplied via the external input terminal 32 and the terminals a and c of the external-input changeover switch 22, to the AGC circuit 23. The input signal is adjusted so as to have a constant level at which the signal can be recorded, and then supplied to the video signal recording circuit 25 and the input terminal a of the first changeover switch 24.

When the video tape recorder 21 is in the recording mode (dubbing mode), therefore, the video signal reproduced by the separate video tape recorder is recorded on the loaded recording medium 27.

Whether the recording mode is set or not, the reproduced video signal is supplied to the television signal processing circuit 33 via the terminals a and c of the first changeover switch 24, to be subjected to a predetermined process. The processed signal is then supplied to the cathode ray tube 34 and the loudspeaker 35.

In other words, when a video signal reproduced from the recording medium by the separate video tape recorder is input via the external input terminal 32, the reproduced video signal is supplied via the AGC circuit 23 to the television signal processing circuit 33 whether the video tape recorder 21 is in the recording mode or not.

The AGC circuit 23 generally detects the level of the horizontal synchronizing signal and adjusts the detected horizontal synchronizing signal so as to have a constant level, thereby adjusting the input signal to a constant level at which the signal can be recorded (this level is set to be 1 $V_{p\text{-}p}$).

Incidentally, as video tape recorders have become widely used, the problem of unauthorized duplication of a video tape has been given a great deal of attention. Recently, therefore, a video tape which has been subjected to a so-called copy protection processing has been made available in order to protect against such unauthorized duplication.

In the copy protection processing, a pulse-like signal is superposed in the horizontal synchronizing signal portion of a video signal recorded on a video tape, so that the horizontal synchronizing signal is forcedly changed in level. When a video signal on which such a processing has been conducted is processed by the AGC circuit 23, the resulting signal does not meet standards. When such an out-of-standard video signal is reproduced, the reproduced image is very unclear (or it is substantially filled with noise).

In the above-described television receiver with a video tape recorder, when a copy-protected reproduced video signal is supplied from the separate video tape recorder connected to the external input terminal 32, the reproduced video signal must be passed through the AGC circuit 23 of the video tape recorder 21. Even in the case where the reproduced video signal is merely displayed on the television receiver, therefore, there arises a problem in that the television receiver displays only a very unclear image.

In other words, when a copy-protected video signal which is reproduced by the separate video tape recorder is displayed on the above-described conventional television receiver, the resulting image is very unclear, thereby producing a problem in that it is impossible to view the image. This problem is produced also in the case where a copy-protected television signal is transmitted by radio waves and then received via the RF input terminal 28.

SUMMARY OF THE INVENTION

The invention has been made in order to solve the above problem. It is an object of the invention to provide an external input signal processing circuit for a television receiver with a video tape recorder in which, even when a copy-protected video signal is externally input, a mere viewing can be done on the television receiver.

In order to attain the above object, the invention provides an external input signal processing circuit for a television receiver with a video tape recorder integrally incorporated therein, the video tape recorder having recording and reproducing functions, the external input signal processing circuit including: an automatic gain control circuit connected to an external input terminal of the video tape recorder; a video signal recording circuit connected to the automatic gain control circuit; a video signal reproducing circuit for reproducing a signal recorded on a recording medium; a changeover switch whose one input terminal is connected to an input (terminal) side of the automatic gain control circuit, the other input terminal is connected to the video signal reproducing circuit, and common terminal is connected to a television signal processing circuit for display; and a switch circuit for controlling the changeover switch so that the one input terminal and the common terminal of the changeover switch are connected to each other when the video tape recorder is in a recording mode.

Further, the invention provides an external input signal processing circuit for a television receiver with a video tape recorder integrally incorporated therein, the video tape recorder having recording and reproducing functions, the external input signal processing circuit including: an automatic gain control circuit connected to an external input terminal of the video tape recorder; a video signal recording circuit connected to the automatic gain control circuit; a video signal reproducing circuit for reproducing a signal recorded on a recording medium; a first changeover switch whose one input terminal is connected to an output side of the automatic gain control circuit, and the other input terminal is connected to the video signal reproducing circuit; a second changeover switch whose one input terminal is connected to an input (terminal) side of the automatic gain control circuit, the other input terminal is connected to a common terminal of the first changeover switch, and common terminal is connected to a television signal processing circuit for display; and a switch circuit for controlling the first and second changeover switches so that the one input terminal and the common terminal of the first changeover switch are connected to each other, and the one input terminal and the common terminal of the second changeover switch are connected to each other, when the video tape recorder is in a recording mode.

DETAILED DESCRIPTION OF THE PREFERRED EMBODIMENT

Figure 1:
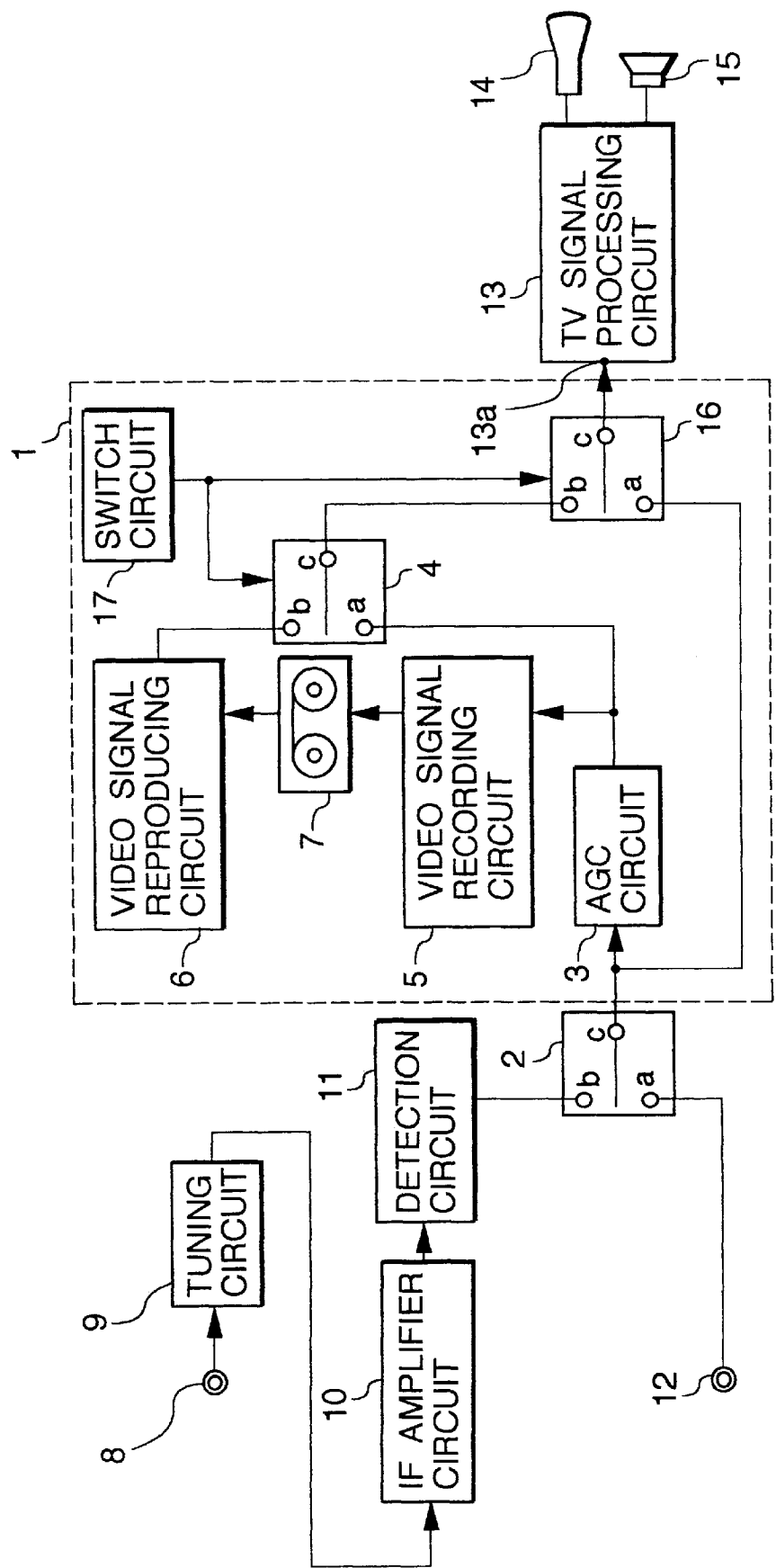
FIG. 1 is a block diagram showing the electrical connection of an external input signal processing circuit in a television receiver with a video tape recorder according to an embodiment of the invention.
Figure 2:
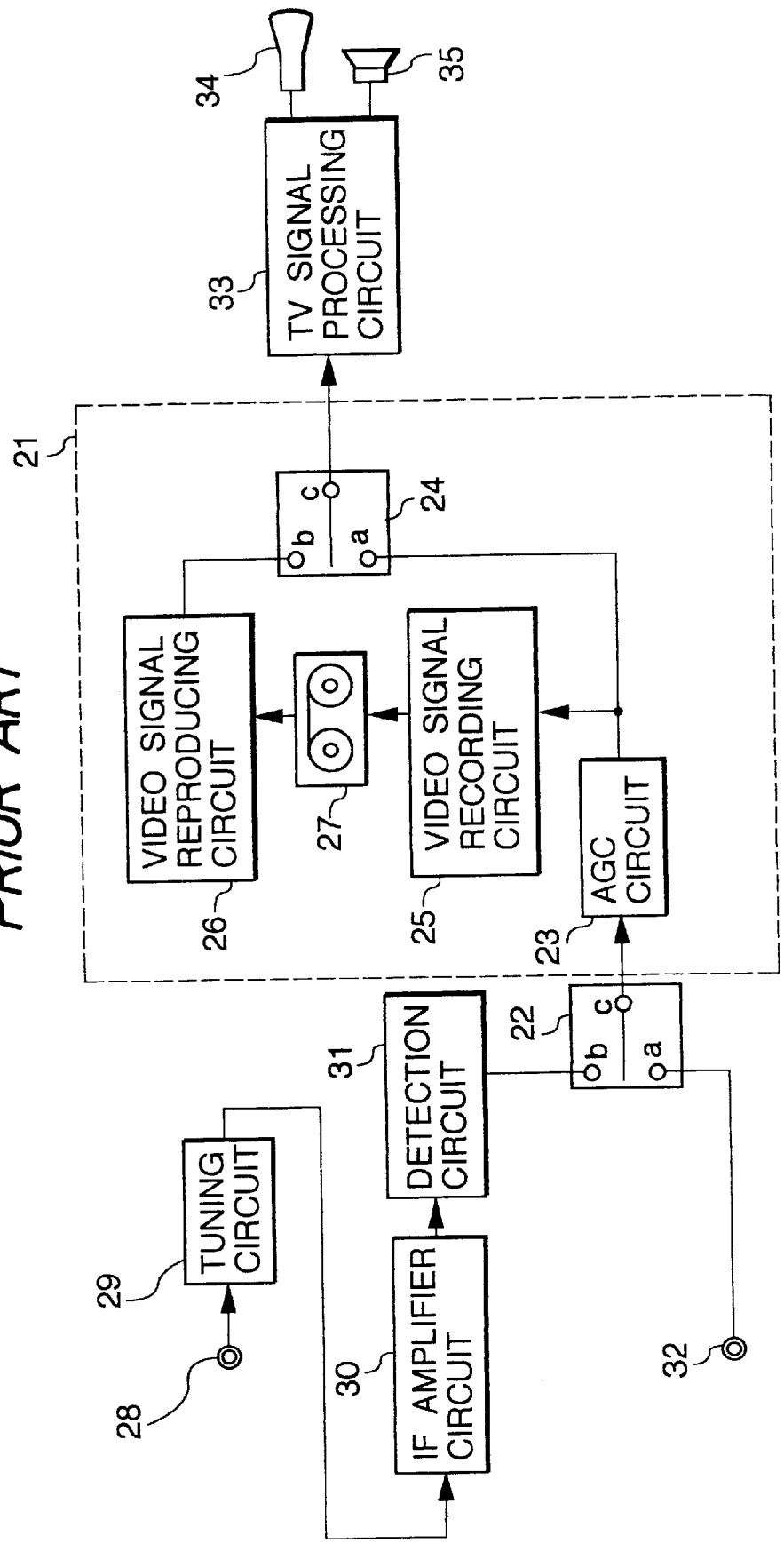
FIG. 2 is a block diagram showing the electrical connection of a conventional television receiver with a video tape recorder.

Hereinafter, an embodiment of the invention will be described with reference to the drawing.

FIG. 1 is a block diagram showing the electrical connection of an external input signal processing circuit in a television receiver with a video tape recorder according to the embodiment of the invention.

In the figure, reference numeral 1 designates a video tape recorder; 2, an external-input changeover switch; 3, an AGC circuit; 4, a first changeover switch; 5, a video signal recording circuit; 6, a video signal reproducing circuit; 7, a recording medium such as a video tape; 8, an RF input terminal; 9, a tuning circuit; 10, an intermediate frequency amplifier circuit; 11, a detection circuit; 12, an external input terminal; 13, a television signal processing circuit; 14, a cathode ray tube; and 15, a loudspeaker. These components are configured in the same manner as those of the conventional television receiver with a video tape recorder which has been described above.

In the television receiver with a video tape recorder of the embodiment having the above-described components, a second changeover switch 16 is interposed between a common terminal c of the first changeover switch 4 and an input terminal 13a of the television signal processing circuit 13, and a switch circuit 17 is disposed to control the changeover operation of the second changeover switch 16 so as to be interlocked with that of the first changeover switch 4.

More specifically, terminals of the second changeover switch 16 are connected in the following manner. One input terminal (R/EE terminal) a is connected to the input terminal side of the AGC circuit 3, the other terminal (P terminal) b to the common terminal c of the first changeover switch 4, and the common terminal c to the input terminal 13a of the television signal processing circuit 13.

The switch circuit 17 controls the changeover operations of the first and second changeover switches 4 and 16 in the following manner. When the input terminal (R/EE terminal) a and the common terminal c of the first changeover switch 4 are connected to each other, the input terminal (R/EE terminal) a and the common terminal c of the second changeover switch 16 are connected to each other. When the input terminal (P terminal) b and the common terminal c the first changeover switch 4 are connected to each other, the input terminal (P terminal) b and the common terminal c of the second changeover switch 16 are connected to each other.

The switch circuit 17 conducts the control on the first and second changeover switches 4 and 16 in response to an instruction signal from a control circuit (not shown) which controls the whole of the video tape recorder 1.

Next, the operation of the thus configured television receiver with a video tape recorder will be described.

In the case where a separate video tape recorder (not shown) is connected to the external input terminal 12 and a reproduced video signal from the video tape recorder is input, the common terminal c of the external-input changeover switch 2 is connected to the input terminal a. In the case where a television signal or the like is transmitted by radio waves and then received via the RF input terminal 28, the common terminal c of the external-input changeover switch 2 is connected to the input terminal b.

In the case where an external input signal supplied via the common terminal c of the external-input changeover switch 2 is to be recorded on the recording medium 7 loaded into the video tape recorder 1 or to be displayed on the cathode ray tube 14, the switch circuit 17 controls the first and second changeover switches 4 and 16 so that the common terminal c of the switch 4 is connected to the input terminal a of the switch 4 and the common terminal c of the switch 16 is connected to the input terminal a of the switch 16.

As a result of this control, when the video tape recorder 1 is in the recording mode, the external input signal (video signal) is recorded on the recording medium 7 loaded into the video tape recorder 1. Further, the external input signal is directly input to the television signal processing circuit 13 via the terminals a and c of the external-input changeover switch 2 and the terminals a and c of the second changeover switch 16 and without passing through the AGC circuit 3 of the video tape recorder 1. The signal is subjected to a predetermined process in the television signal processing circuit 13, and then displayed as an image on the cathode ray tube 14 and output as sound through the loudspeaker 15.

In other words, even when an external input signal input via the RF input terminal 8 or the external input terminal 12 is a copy-protected signal, the signal is supplied to the television signal processing circuit 13 without being subjected to the AGC processing in the video tape recorder 1. Therefore, an excellent reproduced image is displayed on the cathode ray tube 14 and excellent sound is output from the loudspeaker 15. Namely, although the recording operation cannot be done, a mere viewing can be done.

In addition, when the recording medium 7 which has been subjected to a copy protection processing is loaded into the video tape recorder 1 and the recording mode is set, the switch circuit 17 controls the first and second changeover switches 4 and 16 so that the common terminal c of the switch 4 is connected to the input terminal b of the switch 4 and the common terminal c of the switch 16 is connected to the input terminal b of the switch 16. Consequently, in the same manner as the conventional system, a usual reproducing operation is conducted so that an excellent reproduced image is displayed on the cathode ray tube 14 and excellent sound is output from the loudspeaker 15.

In the external input signal processing circuit for a television receiver with a video tape recorder according to the invention, an external input terminal of a video tape recorder is connected to one input terminal of a first changeover switch via an AGC circuit, an output of a video signal reproducing circuit is connected to the other input terminal of the first changeover switch, and a common terminal of the first changeover switch is connected to an input terminal of a television signal processing circuit. A second changeover switch is interposed between the common terminal of the first changeover switch and the input terminal of the television signal processing circuit, one input terminal of the second changeover switch is connected to an input terminal side of the AGC circuit, the other input terminal of the second changeover switch is connected to the common terminal of the first changeover switch, and the common terminal of the second changeover switch is connected to the input terminal of the television signal processing circuit. Furthermore, a switch circuit is disposed which controls the second changeover switch so that, when the one input terminal and the common terminal of the first changeover switch are connected to each other, the one input terminal and the common terminal of the second changeover switch are connected to each other, and, when the other input terminal and the common terminal of the first changeover switch are connected to each other, the other input terminal and the common terminal of the second changeover switch are connected to each other. Even when the external input signal is a copy-protected signal, therefore, the external input signal can be supplied to the television signal processing circuit without passing through the AGC circuit of the video tape recorder. Consequently, the television receiver can display an excellent reproduced image and a loudspeaker can output excellent sound. In other words, although the recording operation cannot be done, a mere viewing can be done.

What is claimed is:

1. An external input signal processing circuit, for a television receiver with a video tape recorder, the video tape recorder having recording and reproducing functions, said external input signal processing circuit comprising:

an automatic gain control circuit having an input terminal connected to an external input terminal of the video tape recorder and an output terminal connected to a video signal recording circuit for recording a video signal on a recording medium;

a video signal reproducing circuit for reproducing a video signal recorded on said recording medium;

an internal/external viewing changeover switch having one input terminal connected to receive a video signal from said video signal reproducing circuit, another input terminal connected to between said input terminal of said automatic gain control circuit and said external input terminal, and a common terminal connected to a television signal processing circuit to permit viewing of a signal reproduced by said reproducing circuit or input terminal; and a switch circuit for controlling said internal/external viewing changeover switch so that the one input terminal and the common terminal of said internal/external viewing changeover switch are connected to each other when the video tape recorder is in a recording mode.

2. The external input signal processing circuit according to claim 1, further comprising:

a record/reproduce changeover switch having a first input terminal connected to an output terminal of the automatic gain control circuit, a second input terminal connected to said video signal reproducing circuit, and a common terminal connected to said one input of the external/internal viewing switch.

3. The external input signal processing circuit according to claim 2, further comprising an external source changeover switch disposed between the external-input terminal and said automatic gain control circuit for switching between different external video signal sources.

4. The external input signal processing circuit according to claim 2, wherein said switch circuit controls both said record/reproduce changeover switch and said external/internal viewing changeover switch, such that when the video tape recorder is in a recording mode, said one input and said common terminal of the external/internal viewing changeover are connected to each other and said first input and common terminal of the record/reproduce changeover switch are connected to each other to permit viewing a signal output by said automatic gain control circuit as it is being recorded.

* * * * *